United States Patent
Minichino et al.

(10) Patent No.: US 12,182,276 B1
(45) Date of Patent: Dec. 31, 2024

(54) SYSTEMS AND METHODS FOR SECURELY IDENTIFYING CONTENT

(71) Applicant: Stealthbits Technologies LLC, Hawthorne, NJ (US)

(72) Inventors: Robert Edward Minichino, Haskell, NJ (US); Michael James Longo, Ridgewood, NJ (US); Michael McLean Rubacky, Jersey City, NJ (US)

(73) Assignee: Stealthbits Technologies LLC, Hawthorne, NJ (US)

( * ) Notice: Subject to any disclaimer, the term of this patent is extended or adjusted under 35 U.S.C. 154(b) by 274 days.

(21) Appl. No.: 17/552,302

(22) Filed: Dec. 15, 2021

Related U.S. Application Data

(60) Provisional application No. 63/137,606, filed on Jan. 14, 2021.

(51) Int. Cl.
| G06F 21/00 | (2013.01) |
| G06F 21/60 | (2013.01) |
| G06F 21/62 | (2013.01) |
| H04L 9/32  | (2006.01) |

(52) U.S. Cl.
CPC ........ G06F 21/602 (2013.01); G06F 21/6218 (2013.01); H04L 9/3239 (2013.01)

(58) Field of Classification Search
CPC ... G06F 21/602; G06F 21/6218; H04L 9/3239
See application file for complete search history.

(56) References Cited

U.S. PATENT DOCUMENTS

| 6,813,690 B1* | 11/2004 | Lango ............... G06F 12/0866 |
| | | 711/E12.019 |
| 2009/0262925 A1* | 10/2009 | Vijayarangan ........ H04L 9/0643 |
| | | 380/29 |
| 2012/0151584 A1* | 6/2012 | Kim ....................... G06F 21/552 |
| | | 726/23 |
| 2015/0280918 A1* | 10/2015 | Uzun .................... H04L 9/3247 |
| | | 713/176 |
| 2018/0018235 A1* | 1/2018 | Arslan ............... H03M 13/1177 |
| 2020/0134086 A1* | 4/2020 | Arunski ................ G06F 16/328 |

* cited by examiner

*Primary Examiner* — Ghazal B Shehni
(74) *Attorney, Agent, or Firm* — Austin Rapp

(57) ABSTRACT

A method is described. The method includes streaming subject data from a subject repository. The method also includes storing a subject length of the subject data. The method further includes executing a hash function on the subject data to produce a subject hash value. The method additionally includes executing the hash function on content data from a content stream based on the subject length to produce a content hash value. The method also includes detecting whether the content data matches the subject data based on the subject hash value and the content hash value. The method further includes reporting a match detection in response to detecting that the content data matches the subject data.

20 Claims, 8 Drawing Sheets

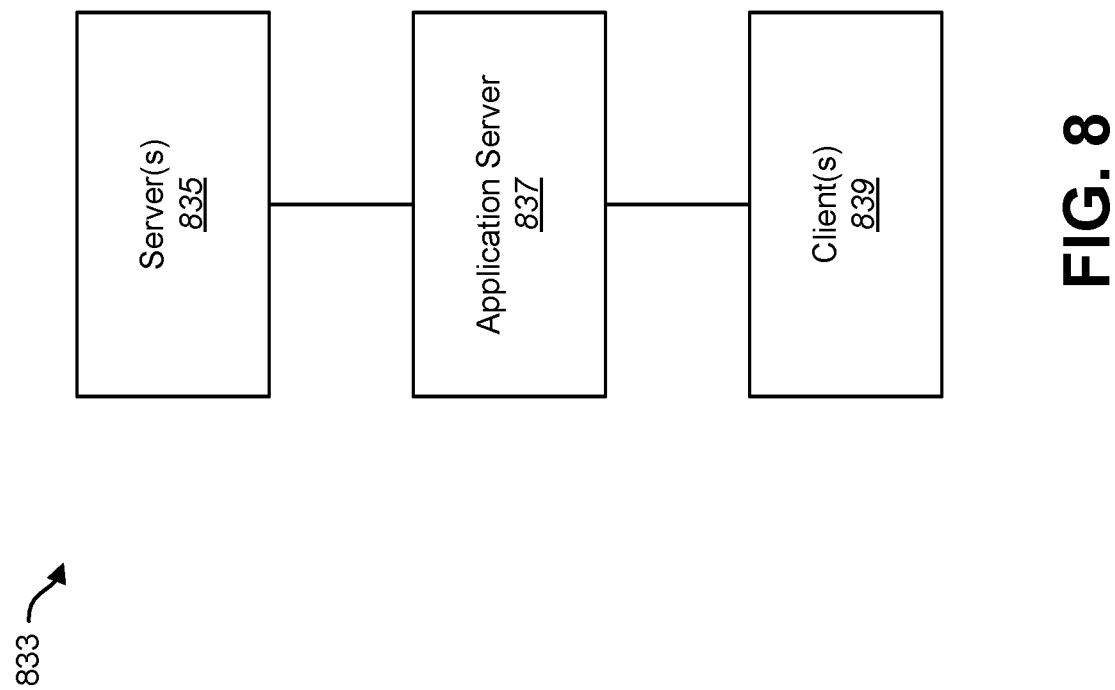

SYSTEMS AND METHODS FOR SECURELY IDENTIFYING CONTENT

RELATED APPLICATION

This application is related to and claims priority from U.S. Provisional Patent Application No. 63/137,606 entitled "SYSTEMS AND METHODS FOR SECURELY IDENTIFYING CONTENT," filed on Jan. 14, 2021, which is hereby incorporated by reference herein, in its entirety.

TECHNICAL FIELD

The present disclosure relates generally to computers and computer-related technology. More specifically, the present disclosure relates to systems and methods for securely identifying content.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work, and/or school. One type of an electronic device is a computer.

The technology being used in computers has been improving rapidly. Computers may range from small handheld computing devices to desktop computer systems to large multi-processor computer systems. In some configurations, multiple computers may communicate in a network environment.

Use of computing technology often creates data. For instance, documents, emails, text, and other data may be created through the use of computers. Improving data usage may be beneficial.

BRIEF DESCRIPTION OF THE DRAWINGS

FIG. 8 is a block diagram illustrating one configuration of a network where systems and methods for security identifying content may be implemented.

DETAILED DESCRIPTION

Figure 1:
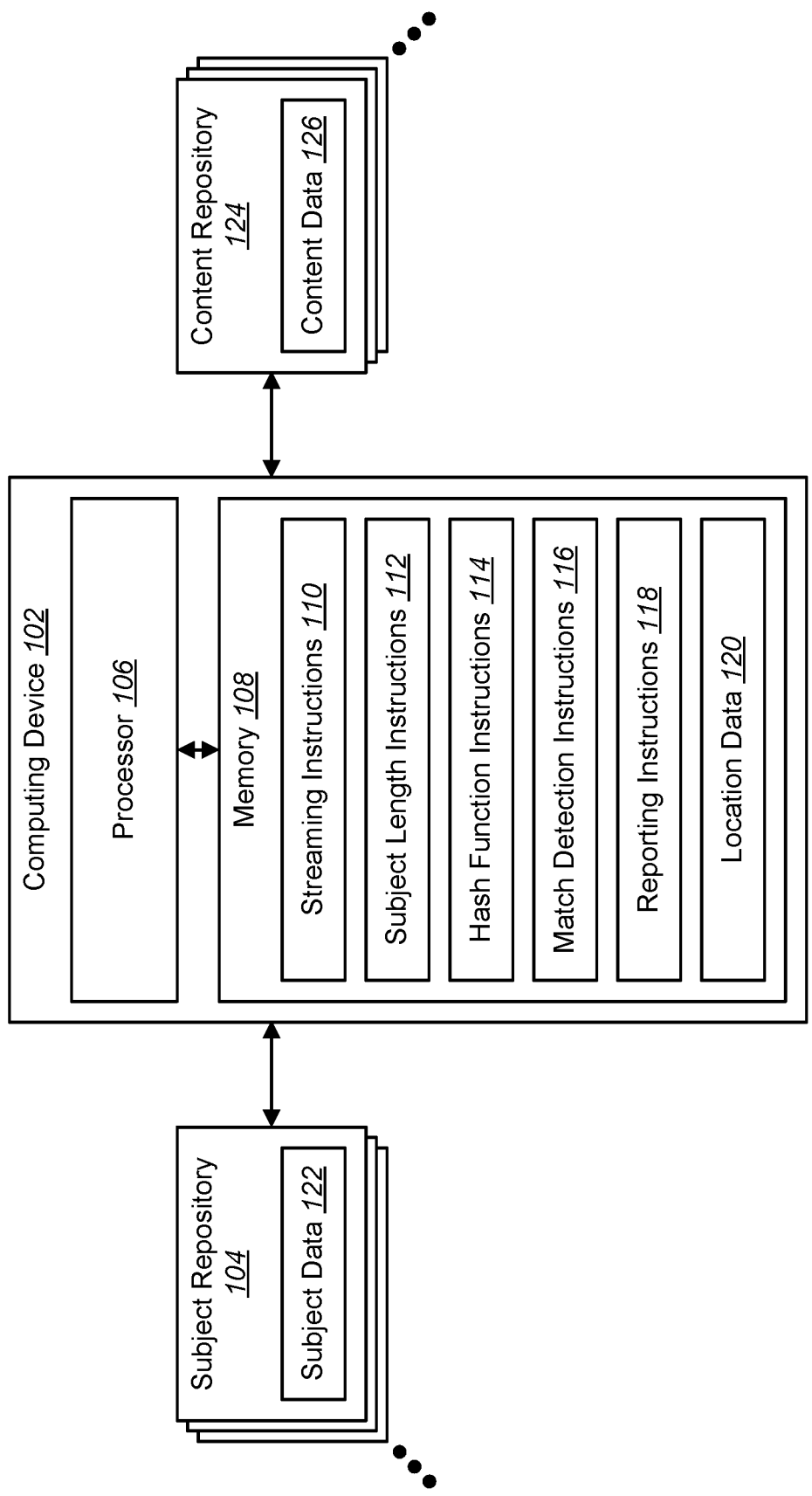
FIG. 1 is a block diagram illustrating one configuration of a computing device in which systems and methods for securely identifying content may be implemented.

A method is described. The method includes streaming subject data from a subject repository. The method also includes storing a subject length of the subject data. The method further includes executing a hash function on the subject data to produce a subject hash value. The method additionally includes executing the hash function on content data from a content stream based on the subject length to produce a content hash value. The method also includes detecting whether the content data matches the subject data based on the subject hash value and the content hash value. The method further includes reporting a match detection in response to detecting that the content data matches the subject data.

The method may include storing a location of the content data in response to detecting that the content data matches the subject data. The method may include executing a second hash function on the subject data to produce a second subject hash value. The second hash function may have a lower collision probability than the hash function.

The method may include determining whether the subject hash value matches the content hash value. The method may include executing the second hash function on the content data to produce a second content hash value in response to determining that the subject hash value matches the content hash value.

Detecting whether the content data matches the subject data may include determining whether the second subject hash value matches the second content hash value in response to determining that the subject hash value matches the content hash value, and may include detecting that the content data matches the subject data in response to determining that the second subject hash value matches the second content hash value. The hash function may be a polynomial hash function and the second hash function may be a secure hash algorithm (SHA) hash function.

The content data may be within a character range having a size of the subject length. The method may include shifting the character range to next content data in the content stream and executing the hash function on the next content data in response to detecting that the content data does not match the subject data.

Executing the hash function on the next content data may include subtracting a first factor from the content hash value and may include adding a second factor to the content hash value to produce an updated content hash value. The first factor may be associated with a first character dropped from the character range. The second factor may be associated with a second character added to the character range.

Storing the subject length of the subject data may include storing a set of subject string lengths corresponding to a set of subject strings. Executing the hash function on the subject data may include executing the hash function on the set of subject strings to produce a set of subject hash values. The method may include categorizing the subject hash values according to corresponding subject string lengths.

A computing device is also described. The computing device includes a processor. The computing device also includes a memory in electronic communication with the processor. The computing device further includes instructions stored in the memory. The instructions are executable to stream subject data from a subject repository. The instructions are also executable to store a subject length of the subject data. The instructions are further executable to execute a hash function on the subject data to produce a subject hash value. The instructions are additionally executable to execute the hash function on content data from a content stream based on the subject length to produce a content hash value. The instructions are also executable to detect whether the content data matches the subject data based on the subject hash value and the content hash value. The instructions are further executable to report a match detection in response to detecting that the content data matches the subject data.

A non-transitory, tangible computer-readable medium is also described. The computer-readable medium includes executable instructions for streaming subject data from a subject repository. The computer-readable medium also includes executable instructions for storing a subject length of the subject data. The computer-readable medium further includes executable instructions for executing a hash function on the subject data to produce a subject hash value. The computer-readable medium additionally includes executable instructions for executing the hash function on content data from a content stream based on the subject length to produce a content hash value. The computer-readable medium also includes executable instructions for detecting whether the content data matches the subject data based on the subject hash value and the content hash value. The computer-readable medium further includes executable instructions for reporting a match detection in response to detecting that the content data matches the subject data.

In view of new data privacy regulations and internal efforts by companies and organizations to keep track of sensitive data, there is a need to search for and identify specific pieces of data that are associated with a specific subject (e.g., individual or other entity). Some approaches to finding data may either search for generic patterns that may resemble sensitive data or may require maintaining a list of search terms of specific sensitive data that can be used to identify a specific person (e.g., a customer, employee, user, entity related to an organization, etc.). These approaches may have disadvantages, as the former may fail to capture data associated with a specific subject (e.g., individual), and may not capture sensitive data that fails to conform to an easily identifiable pattern. The latter may pose a security risk, as it requires the aggregation and storage of all sensitive data pertaining to all subjects (e.g., individuals) for data searching or tracking.

Various examples are described with reference to one or more of the Figures. The systems and methods described herein may be arranged in a variety of implementations. Accordingly, the Figures are representative of the systems and methods described herein, and are not intended to limit the scope of the claims. In some cases, similar element numbers may correspond to similar elements in the Figures. When an item is referred to without an element number, this may refer to the item generally with and/or without limitation to a particular Figure.

FIG. 1 is a block diagram illustrating one configuration of a computing device 102 in which systems and methods for securely identifying content may be implemented. A computing device is an electronic device that includes circuitry (e.g., an application-specific integrated circuit (ASIC), logic circuitry, and/or one or more processors, etc.). Examples of the computing device 102 include a desktop computer, laptop computer, tablet computer, server, etc. In some examples, the computing device 102 may be configured to communicate in a network environment. For example, the computing device 102 may include one or more wired and/or wireless network interfaces (e.g., Ethernet port(s), antenna(s), modem(s), and/or transceiver(s), etc.). In some examples, the computing device 102 may communicate with one or more remote devices (e.g., server(s), network device(s), remote storage device(s), and/or computing device(s), etc.) over a network or networks (e.g., wide area network (WAN), the Internet, local area network(s) (LAN(s)), intranet(s), etc. For instance, the computing device 102 may be connected to one or more network devices (e.g., router(s), modem(s), switch(es), hub(s), etc.) with one or more wired and/or wireless links.

The computing device 102 may communicate with a subject repository 104 or subject repositories. A subject repository 104 may be a device that stores subject data 122 and/or that provides access to subject data 122. In some examples, the subject repository 104 may be one or more servers, one or more network storage devices, one or more external drives, etc. In some examples, the subject repository 104 may be one or more computing devices that provide a web service (e.g., salesforce, Epic systems, Oracle PeopleSoft, paycom, Ping Identity, etc.). Subject data 122 may be data about one or more individuals, entities, and/or things. In some examples, the subject data 122 may be sensitive data. Sensitive data may be data that is sensitive in nature (e.g., private data, privileged data, data with an associated security risk of disclosure, etc.). Examples of sensitive data may be data that indicates individually identifiable information, confidential information, location (e.g., street address, global positioning system (GPS) information, etc.), name, date of birth, phone number, contact information, private information, health information, treatment information, medical records, privileged information, identification information, social security number, driver's license number, employment information, account information, and/or financial information, etc. In some examples, the subject data 122 may be organized in terms of subjects. For instance, the subject data 122 may be organized in terms of people (e.g., names), where each entry is associated with additional information (e.g., address, date of birth, social security number, medical identification number, etc.). In some examples, the computing device 102 may communicate with the subject repository 104 over one or more networks (e.g., the Internet, intranet, and/or LAN, etc.). In some examples, the memory 108 may include subject repository interface instructions (not shown in FIG. 1) to facilitate communication with the subject repository 104. For instance, the subject repository interface instructions may include application programming interface (API) instructions and/or other instructions to enable communicating with (e.g., receiving data from and/or sending data to) the subject repository 104. The processor 106 may execute the subject repository interface instructions to request and/or receive subject data 122 from the subject repository 104.

The computing device 102 may communicate with a content repository 124 or content repositories. A content repository 124 may be a device that stores content data 126 and/or that provides access to content data 126. In some examples, the content repository 124 may be one or more servers, one or more network storage devices, one or more external drives, etc. In some examples, the content repository 124 may be one or more computing devices that provide a service (e.g., Microsoft Outlook, Microsoft Exchange, Dropbox, Amazon Drive, Amazon Web Services, Google Drive, structured query language (SQL) database(s), mongoDB, PostgreSQL, and/or MySQL, etc.). Content data 126 may include structured and/or unstructured data. Structured data may be data that is organized (e.g., indexed, sorted, and/or categorized, etc.) in a database. Unstructured data may be data that is not necessarily organized (e.g., indexed, sorted, and/or categorized, etc.) in a database. Content data 126 may include text, numerical data (e.g., numbers), characters, etc. In some examples, content data 126 may include document(s) (e.g., text, numbers, symbols, and/or characters, etc., in document(s)), email(s) (e.g., text, numbers, symbols, and/or characters, etc., in email(s)), database(s) (e.g., text, numbers, symbols, and/or characters, etc., in database(s)), website(s) (e.g., text, numbers, symbols, and/or characters, etc., in website(s)), and/or drive data (e.g., text, numbers, symbols, and/or characters, etc., in drive(s)), etc. Content data 126 may include non-sensitive data and/or sensitive data. In some examples, the computing device 102 may communicate with the content repository 124 over one or more networks (e.g., the Internet, intranet, and/or LAN, etc.). In some examples, the memory 108 may include content repository interface instructions (not shown in FIG. 1) to facilitate communication with the content repository 124. For instance, the content repository interface instructions may include API instructions and/or other instructions to enable communicating with (e.g., receiving data from and/or sending data to) the content repository 124. The processor 106 may execute the content repository interface instructions to request and/or receive content data 126 from the content repository 124.

The computing device 102 may include a processor 106 and a memory 108. The processor 106 is circuitry to execute one or more instructions. For example, the processor 106 may include logic circuitry to perform and/or execute one or more instructions stored in the memory 108. In some examples, the computing device 102 may additionally or alternatively include one or more circuits implemented to perform one or more of the functions and/or operations described herein.

The memory 108 may include one or more electronic memory devices. For example, the memory 108 may include programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, and/or registers, etc. The memory 108 may store instructions (e.g., executable instructions, code, etc.) and/or data. For example, the memory 108 may include streaming instructions 110, subject length instructions 112, hash function instructions 114, match detection instructions 116, reporting instructions 118, and/or location data 120.

The computing device 102 (e.g., processor 106) may execute the streaming instructions 110 to stream subject data 122 from the subject repository 104 (or subject repositories). In some examples, the computing device 102 (e.g., processor 106) may execute the streaming instructions 110 to stream content data 126 from the content repository 124 (or content repositories). Streaming data may include receiving the data. For example, streaming data may include receiving data over a link or links (e.g., wired and/or wireless links). In some examples, streaming may include receiving data without creating a permanent and/or non-volatile copy of the data. In some examples, streaming may include receiving data, deleting the data, and/or overwriting the data. For instance, the data may be utilized for one or more functions and/or operations and may be discarded, deleted, and/or overwritten. In some examples, the original data (e.g., streamed data, subject data 122, and/or content data 126, etc.) may not be readable and/or may not be directly reconstructed from the information (e.g., from only the information) stored on the computing device 102. For instance, after the streamed data has been utilized and deleted, discarded, and/or overwritten, the streamed data may not be recorded and/or may not be available on computing device storage and/or memory 108.

In some examples, streaming the subject data 122 may include performing one or more scans of the subject repository 104. For instance, the computing device 102 may perform an initial scan of the subject data 122 to determine the hash value(s) and/or subject profile data corresponding to the subject data 122. After the initial scan, the computing device 102 may perform (e.g., periodically perform) one or more scans (e.g., delta scans) to update the hash data in accordance with one or more changes (e.g., additions, deletions, modifications, etc.) in the subject data 122 since the previous scan.

In some examples, streaming the content data 126 may include performing one or more scans of the content repository 124. For instance, the computing device 102 may perform an initial scan of the content data 126 to determine the hash value(s) corresponding to the content data 126. After the initial scan, the computing device 102 may perform (e.g., periodically perform) one or more scans (e.g., delta scans) to update the hash data in accordance with one or more changes (e.g., additions, deletions, modifications, etc.) in the content data 126 since the previous scan.

The computing device 102 (e.g., processor 106) may execute the subject length instructions 112 to store a subject length of the subject data 122. For example, the computing device 102 (e.g., processor 106) may determine a length (e.g., number of characters, letters, numbers, symbols, bits, and/or spaces, etc.) of the subject data 122. For instance, if the (streamed) subject data is a last name "McDonald," the subject length may be 8 characters, if the subject data is a social security number, the subject length may be 9 characters (without hyphens or spaces) or 11 characters (with hyphens or spaces), if the subject data is a date of birth, the subject length may be 6 characters (for a six-digit date without slashes) or 8 characters (with slashes), etc. The computing device 102 may store the subject length (in the memory 108 and/or other storage, for instance). For example, the computing device 102 (e.g., processor 106 and/or memory 108) may store the subject length in a subject profile database.

The computing device 102 (e.g., processor 106) may execute the hash function instructions 114 to execute a hash function on the subject data 122 to produce a subject hash value. A hash function may be a function that produces a hash value (e.g., a number) based on an input. For instance, a hash function may map an input (e.g., subject data, content data, etc.) to a hash value in a hash table. The hash-function may be a one-way function and/or a cryptographic hash function. For instance, the original input may be difficult, infeasible, or impossible to reconstruct from the hash value alone. Examples of the hash function may include polynomial hash functions, rolling hash functions, secure hash algorithm (SHA) functions (e.g., SHA-1, SHA-2, SHA-3, etc.), etc. The subject hash value may be a hash value produced based on subject data. In some examples, the subject hash value may be stored in a subject profile database. For instance, the subject hash value may be stored in association with a subject length. In some examples, an entry of the subject profile database may be organized in terms of a subject. For instance, an entry of the subject profile database may include (or may be associated with) a hash value for a person's name and associated hash values of other information (e.g., address, date of birth, social security number, etc.) associated with that person. In some examples, various hash values may have associated contextual information (e.g., type labels such as "name," "date of birth," etc., indicating a type of information that the hash value represents).

The computing device 102 (e.g., processor 106) may execute the hash function instructions 114 to execute the hash function on content data from a content stream based on the subject length to produce a content hash value. For example, the computing device 102 (e.g., processor 106) may utilize a portion (e.g., number of characters, character range, window, etc.) of the content stream that is the same length as the subject length as content data 126. The computing device 102 (e.g., processor 106) may execute the hash function to produce the content hash value. The content hash value may be a hash value that is produced from content data.

In some examples, the hash function instructions 114 may include multiple hash functions. For instance, the hash function instructions 114 may include a hash function and a second hash function, where the second hash function has a lower collision probability than the first hash function. A collision may occur if two different inputs are mapped to the same hash value by the hash function. A hash function may have a different collision probability than another hash function. For instance, a hash function may produce more collisions than another hash function. In some examples, a hash function with a comparatively lower collision probability may be more complex to process than a hash function with a comparatively higher collision probability. In some examples, a hash function may be a polynomial hash function and a second hash function may be an SHA (e.g., SHA-2) hash function. For instance, a polynomial hash function may have a higher collision probability than an SHA-2 hash function.

In some examples, the computing device 102 (e.g., processor 106) may execute the hash function instructions 114 to execute a second hash function on the subject data 122 to produce a second subject hash value. The second hash function may have a lower collision probability than the hash function. For instance, the computing device 102 (e.g., processor 106) may execute a hash function (e.g., polynomial hash function) on the subject data 122 to produce a subject hash value and a second hash function (e.g., SHA-2 hash function) on the subject data 122 to produce a second subject hash value. The second hash function may be more computationally complex to execute than the hash function in some examples. In some examples, the second subject hash value may be stored in a subject profile database. For instance, the second subject hash value may be stored in association with the hash value and the subject length.

The computing device 102 (e.g., processor 106) may execute the match detection instructions 116 to detect whether the content data 126 (e.g., a portion of the content stream) matches the subject data 122 based on the subject hash value and the content hash value. For instance, the computing device 102 (e.g., processor 106) may determine whether the subject hash value and the content hash value are equal. In some examples, if the subject hash value and the content hash value are equal, then the computing device 102 may detect that the content data 126 matches the subject data 122.

In some examples, the computing device 102 (e.g., processor 106) may determine whether the subject hash value matches the content hash value. For instance, the computing device 102 (e.g., processor 106) may determine whether the subject hash value and the content hash value are equal (e.g., the same number). In some examples, the computing device (e.g., processor 106) may execute the second hash function on the content data 126 to produce a second content hash value in response to determining that the subject hash value matches the content hash value. For instance, processing or computation of the second hash function for the content data 126 (and/or for the subject data 122 in some approaches) may not be performed until the subject hash value matches the content hash value.

In some examples, detecting whether the content data 126 matches the subject data 122 may include determining whether the second subject hash value matches the second content hash value in response to determining that the subject hash value matches the content hash value. For instance, the computing device 102 (e.g., processor 106) may determine whether the second subject hash value is equal to the second content hash value. This determination may be performed in response to determining that the subject hash value matches (e.g., is equal to) the content hash value. In some examples, detecting whether the content data 126 matches the subject data 122 may include detecting that the content data matches the subject data in response to determining that the second subject hash value matches the second content hash value. For instance, the computing device 102 (e.g., processor 106) may detect that the content data 126 matches the subject data 122 (e.g., that the subject data 122 was found in the content repository 124) if the second subject hash value matches the second content hash value.

Some of the techniques described herein may avoid the processing load of computing the second hash function until the match between the subject hash value and the content hash value indicates a likely match between the subject data 122 and the content data 126. Executing the second hash function on the subject data 122 and the content data 126 and determining whether the second subject hash value and the second content hash value match may provide greater certainty that an accurate match is detected between the subject data 122 and the content data 126. Accordingly, some of the techniques described herein may improve the functioning of a computing device. For instance, utilizing a hash function to first determine that the subject data hash value matches the content hash value before processing a second (e.g., more computationally intensive) hash function on the content data 126 may reduce the power consumption and/or number of processing cycles to accurately determine that subject data 122 (e.g., sensitive data) is included in a content repository 124.

Some examples of the techniques described herein provide one or more practical applications. For instance, some examples of the techniques described herein may enable determining the location of content matching a subject or subjects. Securely determining the location of subject data over large datasets may be difficult or impractical in some approaches. Some examples of the techniques described herein may enable determining the location(s) in a secure manner while avoiding creating a condensed dataset of explicit information, which could be exploited by bad actors. Accordingly, some examples of the techniques described herein may provide the identification, tracking, and/or notification of sensitive data while reducing an exposure risk for the sensitive data.

The computing device 102 (e.g., processor 106) may execute the reporting instructions 118 to report a match detection in response to detecting that the content data 126 matches the subject data 122. In some examples, reporting a match may include outputting an indicator that a match has been detected. For instance, the computing device 102 may display an indicator (e.g., message, graphic, text, image, report, etc.) indicating that the content data 126 matches the subject data 122 (e.g., that the subject data 122 has been found in the content repository 124). For instance, the computing device 102 may be coupled to a display (e.g., touch screen, monitor, display panel, television, etc.) and may present the indicator on the display. In some examples, reporting a match may include sending an indicator to another device. For instance, the computing device 102 may send a message (e.g., email, text message, phone call, alert, alarm, etc.) to another device (e.g., another computing device, smartphone, tablet device, and/or server, etc.).

In some examples, reporting a match detection may include indicating and/or storing a location of the content data 126 in response to detecting that the content data 126 matches the subject data 122. For instance, the computing device 102 (e.g., processor 106) may execute the reporting instructions 118 to store a location of the content data 126 in response to detecting that the content data 126 matches the subject data 122. In some examples, the location may indicate an address and/or storage location of the content data 126. For instance, the location may be and/or may indicate one or more directories (e.g., file directory(ies), folder name(s), etc.), one or more addresses (e.g., file path(s), pointer(s), web address(es)) and/or one or more location indicators (e.g., line number(s), page number(s), character position(s) in a document, column number, row number, cell index, cell coordinate(s), database link(s), etc.). In some examples, the location may indicate an address of a file and one or more positions (e.g., a range) within the file (e.g., character position(s) in a body of the file) where the match was found in the content data 126. In some examples, one or more locations may be stored and/or presented. In some examples, the one or more locations may be stored in a subject profile database. For instance, the one or more locations may be stored in association with a hash value, a second hash value, and/or a subject length. In some examples, a subject profile database may include and/or indicate one or more subject lengths, one or more hashes, and/or one or more corresponding locations (for one or more subjects, for example). For instance, a portion (e.g., row and/or column) of the subject profile database may include a subject length, a hash value, a second hash value, and one or more locations. In some examples, the subject profile database may include one or more references (e.g., values, indices, codes, locations, etc.) of one or more subject data. For instance, the one or more references may map a subject profile in the subject profile database to subject data subject data 122 that is not stored on the computing device 102.

In some examples, the computing device 102 (e.g., memory 108) may store and/or maintain values (e.g., indices, locations, addresses, numbers, etc.) that refer to the subject data 122 and/or content data 126 to reference to and/or presentation of the content data 126 that matches subject data 122. In some examples, the computing device 102 may store a record (e.g., database, index, list, table, etc.) of matches. The record of matches may be the subject profile database or a different database. The record of matches may indicate a correspondence between one or more subjects and one or more locations (e.g., web addresses, storage addresses, database addresses, etc.) of corresponding content data 126. In some examples, the record of matches may provide the correspondence without storing the actual data (e.g., subject data 122 and/or content data 126).

In some examples, the computing device 102 may perform one or more operations based on the detected matches and/or locations of detected matches. For instance, the computing device 102 may delete (e.g., discard, overwrite) and/or obscure (e.g., censor, redact, etc.) content data 126 corresponding to a subject or subject profile. For instance, the computing device 102 may receive a request from a user to delete and/or obscure any content data 126 that matches a subject and/or subject profile. In configurations where the computing device 102 has access and/or authorization, the computing device 102 may delete and/or obscure the matching content data 126. In some examples, the computing device 102 may send a request to the content repository 124 to delete and/or obscure the matching content data. For instance, the computing device 102 request that the content repository 124 delete and/or obscure data at the location(s) corresponding to the matching content data 126.

In some examples, one or more of the operations and/or functions described herein may be repeated and/or iterated. For instance, the content data 126 examined by the computing device 102 may be within a character range (e.g., within a number of characters, within a "window," etc.) that has a size of the subject length. For example, the computing device 102 may take a character range (e.g., portion) of the content stream, where the character range has a size of the subject length. In some examples, the computing device 102 (e.g., processor 106) may shift the character range to next content data in the content stream and/or may execute the hash function on the next content data in response to the detecting that the content data 126 does not match the subject data 122. For instance, the computing device 102 (e.g., processor 106) may shift the character range in the content stream such that one character is dropped from the character range and one character is added to the character range to determine the second content data.

In some examples, executing the hash function on the second content data may include subtracting a first factor from the content hash value and adding a second factor to the content hash value to produce an updated content hash value. The first factor may be associated with a first character dropped from the character range and the second factor may be associated with a second character added to the character range. For instance, the content hash value corresponding to the content data 126 before the shift may be updated by subtracting one character factor and adding a second character factor, rather than re-computing factors for all of the characters in the character range. This may be an example of an approach to reduce computation time for computing the hash value. In some examples, the hash function used may be considered a polynomial rolling hash as the character range proceeds through the content stream.

Examples of rolling hash computation are given as follows. For instance, a rolling hash value may be computed for a string "test" as follows. The string "test" may serve as an example of subject data 122. In this example, the rolling hash computation uses a coefficient of 5, though another (e.g., larger) prime number may be used. Initially, the rolling hash value is 0. The rolling hash value of 0 may be multiplied by the coefficient of 5, which results in 0. The first character "t" is converted to a corresponding American Standard Code for Information Exchange (ASCII) integer value of 116. This number is multiplied by 2 and 1 is added, resulting in a value of 233. 233 is multiplied by 5, yielding 1165. The second character "e" is converted to the integer 101 and undergoes a similar operation: 101*2+1=203. 203 is added to 1165, resulting in 1368. 1368 is multiplied by 5, yielding 6840. The third character "s" is converted to an integer 115. 115*2+1=231. 231 is added to 6840, resulting in 7071. 7071 is multiplied by 5, yielding 35355. The fourth character "t" is converted to an integer 116. 116*2+1=233. 233 is added to 35355 resulting in 35588. In this example, 35588 is the rolling hash value for the string "test".

An example of computing a rolling hash on content data 126 (e.g., a rolling window of characters) is given as follows. The window size for this example is 4 (e.g., four characters) to determine whether a portion of the content data 126 matches the string "test". In this example, a four-character window is used to search the string "ztest." When the window includes the four-letter string "ztes", a rolling hash value of 37696 is determined using the example approach above. To shift one character to the right, "z" is dropped from the beginning of the window and "t" is added to the end of the window. To drop "z" from the window, the ASCII value of the outgoing character "z" is 122. 122 is multiplied by 2 and 1 is added (similar to the procedure described above), resulting in 245. The coefficient of 5 is raised to the power of the window length minus 1 (e.g., 3). This result in an outgoing coefficient value of $5^3=125$. The outgoing coefficient value is multiplied by the previous value of 245, resulting in 30625. 30625 is subtracted from the original value of 37696, resulting in 7071. A similar procedure as that described above may be used to add a new character. For example, 7071 is multiplied by 5, yielding 35355. The fourth character "t" is converted to integer 116. 116*2+1=233. 233 is added to 35355, resulting in 35588. 35588 matches the rolling hash generated above, so as the window was moved from "ztes" to "test", a match was found. It should be noted that these examples provide potential implementations of rolling hash computation. In some examples, other approaches may be utilized. In some approaches, once the rolling hash values match, another hash value (e.g., SHA-256 hash value) may be computed to determine and/or confirm the match.

In some examples, the computing device 102 (e.g., processor 106) may utilize a cuckoo filter to increase the efficiency of searching for rolling hash hits while scanning content. A cuckoo filter may be similar to a Bloom filter and may allow for searching whether an item is likely in a set or not in the set, without holding the entire set in memory. For instance, the set in which the search is performed may be the rolling hashes of subject data 122, and the item being searched for may be the current rolling hash in the content data 126 scan. The amount of memory space (e.g., space in the memory 108) to hold this data structure may be significantly less than the entire set of subject rolling hashes. For example, detecting whether the content data matches the subject data may include performing, by the computing device 102 (e.g., processor 106), cuckoo filtering.

In some examples, the computing device 102 (e.g., processor 106) may search for multiple subject data (e.g., multiple strings). For instance, the computing device 102 may stream a set of subject strings (e.g., streaming the subject data may include streaming a set of subject strings). The multiple subject data may include strings of same and/or different lengths. For example, the subject length instructions 112 may include instructions that are executable to store a set of subject string lengths (e.g., a set of subject string lengths corresponding to a set of subject strings). The hash function instructions 114 may include instructions executable to execute the hash function on the set of subject strings to produce a set of subject hash values. In some examples, the memory 108 may include instructions executable to categorize the subject hash values according to corresponding subject string lengths. For instance, the computing device 102 (e.g., processor 106) may group hash values that correspond to subject strings of the same length. The computing device 102 (e.g., processor 106) may maintain separate subject hash value categories according to the corresponding subject string lengths. When detecting matches (e.g., determining whether a subject hash value matches a content hash value), the computing device 102 (e.g., processor 106) may compare a content hash value with a character range to (e.g., only to) one or more subject hash values with a subject length (e.g., subject string length) that is equal in size to the size of the character range. For instance, if two subject data (e.g., "Chris" and "Smith") each have a subject length of 5 and another subject data (e.g., "Xavier") has a subject length of 6, the two subject hash values with a subject length of 5 may be categorized into a category with the subject length of 5. When a content hash value is determined for a content string with a character range size of 5, the content hash value may be compared (e.g., only compared) to the two subject hash values in the category with the subject length of 5, and/or may not be compared to a content hash value corresponding to a category of a subject length of 6. Accordingly, some of the techniques described herein may improve the functioning of a computer by making hash value comparison more efficient (where each content hash value is compared to a limited category instead of all subject hash values, for instance).

Some of the techniques described herein may enable content to be identified in a secure manner. For example, the subject data 122 and the content data 126 may be streamed to the computing device 102 and utilized to compute corresponding hash values. In some examples, the subject data 122 and the content data 126 are discarded upon hash computation, which enables comparison of the subject data 122 and the content data 126 without a maintained copy of the subject data 122 and/or the content data 126. Because it would be difficult, infeasible, or impossible to reconstruct the subject data 122 and/or the content data 126 using the hash values alone, the comparison may be performed (and/or a record of the comparison may be generated) in a secure manner. For instance, if the security of the computing device 102 were compromised, the hash values may not be useful to ascertain the subject data 122 and/or the content data 126, and a copy of the subject data 122 and/or the content data 126 may not be available on the computing device 102. Accordingly, some of the techniques described herein may allow searching for and/or identifying sensitive data without creating a duplicate record and/or without creating a nonvolatile copy (e.g., database, table, etc.) of the subject data 122 and/or of the content data 126. Improving the data security may improve the functioning of a computing device. For instance, because the computing device 102 does not create a record and/or copy of the subject data 122 and/or of the content data 126, some of the techniques disclosed herein may consume less memory 108 and/or electronic storage. In some examples, subject data and/or content data may remain spread over multiple devices (e.g., servers, file servers, drives, etc.), which may help to maintain security of the data.

Some examples of a configuration of some of the techniques described herein are given as follows. The computing device 102 may load (e.g., download) subject data 122 (e.g., sensitive data) into RAM and use the subject data 122 to generate two hash values: a rolling hash and a SHA-256 hash. The two hash values with the length of a subject data 122 search term may be stored in a persistent database, which may be used to check any content scanned (e.g., subsequently scanned) for matches. In some examples, some contextual information regarding the subject data 122 may also be stored, such as the category of data and/or an entity that the subject data belongs to.

For instance, a social security number may be downloaded from a cloud identity management provider pertaining to an individual (e.g., "Alice"). The social security number may be used to generate a rolling hash value and a SHA-256 hash value. The two hashes and the length information (9 in this example) may be stored along with contextual information indicating the type (e.g., "social security number") and a reference to Alice. After the hashes and the contextual information are stored, the actual social security number may be deleted, discarded from memory, and/or overwritten (e.g., overwritten with other data, random bits, etc.).

In subsequent scans of textual content, combinations of 9 continuous characters are checked against the database of rolling hashes with a length of 9. For example, in the text string "ABCDEFGHIJKLM," the first "ABCDEFGHI" may be converted to a rolling hash and checked to determine whether the rolling hash matches, in the database, any rolling hash of a 9-length string (e.g., the hash for Alice's social security number). Subsequently, the computing device 102 may follow similar procedures for "BCDEFGHIJ," "CDEFGHIJK," and so on. If a match between the rolling hashes is determined, the computing device 102 may compute a SHA-256 hash of the content (e.g., 9-character string). If the SHA-256 hash of the content matches a SHA-256 hash of the subject data (corresponding to the matching rolling hash, for instance), the computing device 102 may store a location of the matching content (in a record of matches and/or a subject profile) and/or may send a report or notification indicating the match and/or the location.

Figure 2:
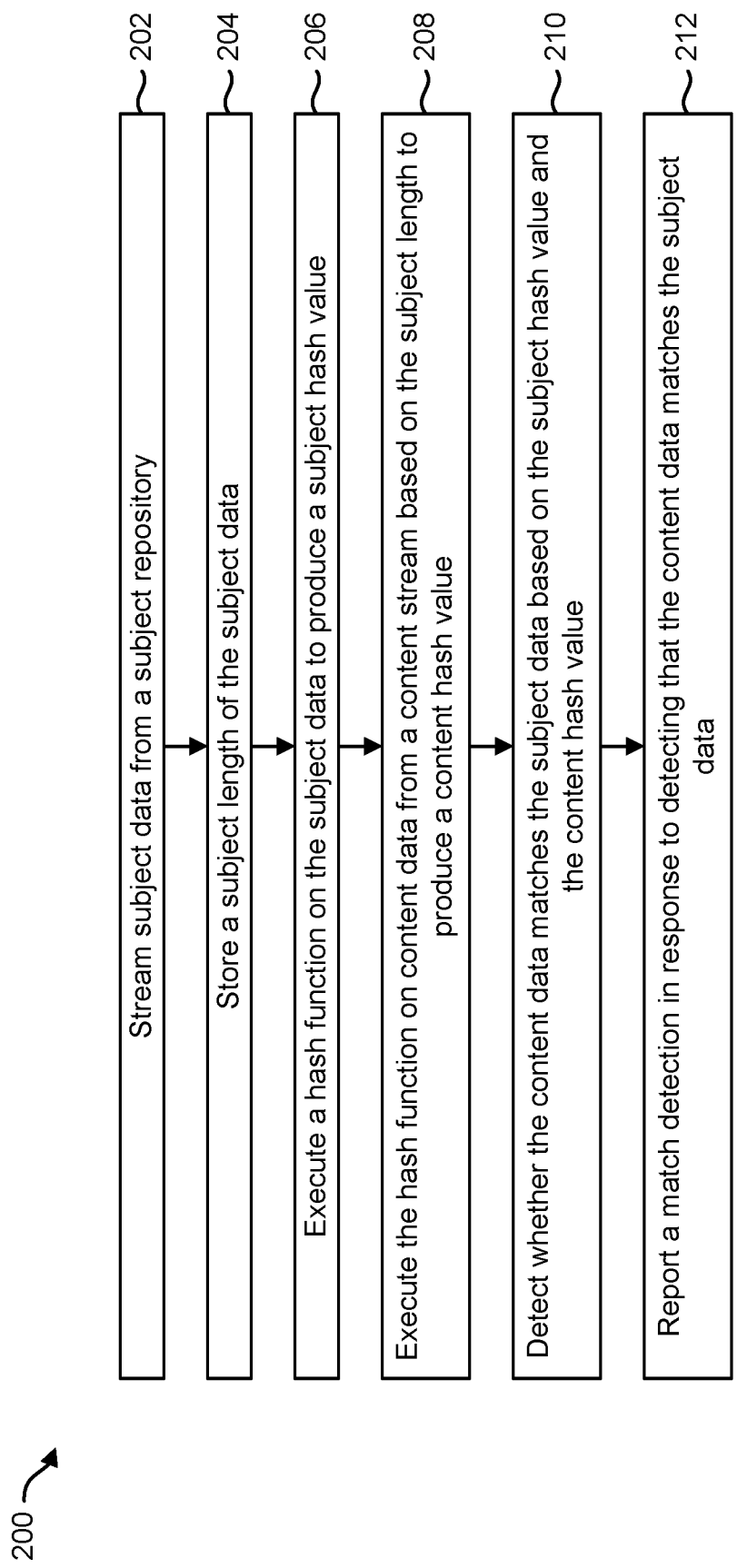
FIG. 2 is a flow diagram illustrating an example of a configuration of a method for securely identifying content.

FIG. 2 is a flow diagram illustrating an example of a configuration of a method 200 for securely identifying content. In some examples, the method 200 may be performed by a computing device (e.g., the computing device 102 described in relation to FIG. 1).

A computing device may stream 202 subject data from a subject repository. In some examples, streaming 202 subject data may be performed as described in relation to FIG. 1. For instance, the computing device may request and/or receive subject data from a subject repository (over network, Internet, and/or LAN link, etc.).

The computing device may store 204 a subject length of the subject data. In some examples, storing 204 the subject length of the subject data may be performed as described in relation to FIG. 1. For instance, the computing device may determine a length (e.g., number of characters in a character string) of the streamed subject data. In some examples, the computing device may determine the subject length by counting a number of bytes of subject data and/or by counting a number of characters (e.g., ASCII) characters in subject data (e.g., a string). The computing device may store the subject length in memory and/or in a database (e.g., subject profile database).

The computing device may execute 206 a hash function on the subject data to produce a subject hash value. In some examples, executing 206 the hash function on the subject data may be performed as described in relation to FIG. 1. For instance, the computing device may compute a polynomial hash function or an SHA hash function, etc., using the subject data. In some examples of a polynomial hash function, the computing device may determine a number corresponding to each character of the subject data (e.g., convert each ASCII value to an integer, get a decimal value for each byte corresponding to each character, etc.), multiply each number with a corresponding factor (where each factor is a constant raised to a different power, for instance), and add the products to produce the subject hash value.

The computing device may execute 208 the hash function on content data from a content stream based on the subject length to produce a content hash value. In some examples, executing 208 the hash function on the content data may be performed as described in relation to FIG. 1. For instance, the computing device may get a portion of the content stream, where the portion includes a number of characters of the subject length (e.g., character range size). The computing device may execute the hash function (e.g., polynomial hash function or SHA hash function, etc.) on the content data. In some examples, the computing device may execute the polynomial hash function on the characters of the content data (e.g., on the portion of the content stream in the character range) to produce the content hash value (similar to computing the polynomial hash function on the subject data as described above, for instance).

The computing device may detect 210 whether the content data matches the subject data based on the subject hash value and the content hash value. In some examples, detecting 210 whether the content data matches the subject data may be performed as described in relation to FIG. 1. For instance, the computing device may compare the subject hash value to the content hash value. If the subject hash value matches the content hash value, the computing device may detect that the content data matches the subject data. If the subject hash value does not match the content hash value, the computing device may determine that the content data does not match the subject data. In some examples, detecting 210 whether the content data matches the subject data may be performed based on comparing multiple hash values (e.g., subject hash value and content hash value, second subject hash value and second content hash value, etc.). For instance, if all of the subject hash values from multiple hash functions match the corresponding content hash values, the computing device may detect 210 a match.

The computing device may report 212 a match detection in response to detecting that the content data matches the subject data. In some examples, reporting 212 the match detection may be performed as described in relation to FIG. 1. For instance, the computing device may display, send, and/or store an indicator of the match. In some examples, the computing device may store a location of the content data in response to detecting that the content data matches the subject data.

Figure 3:
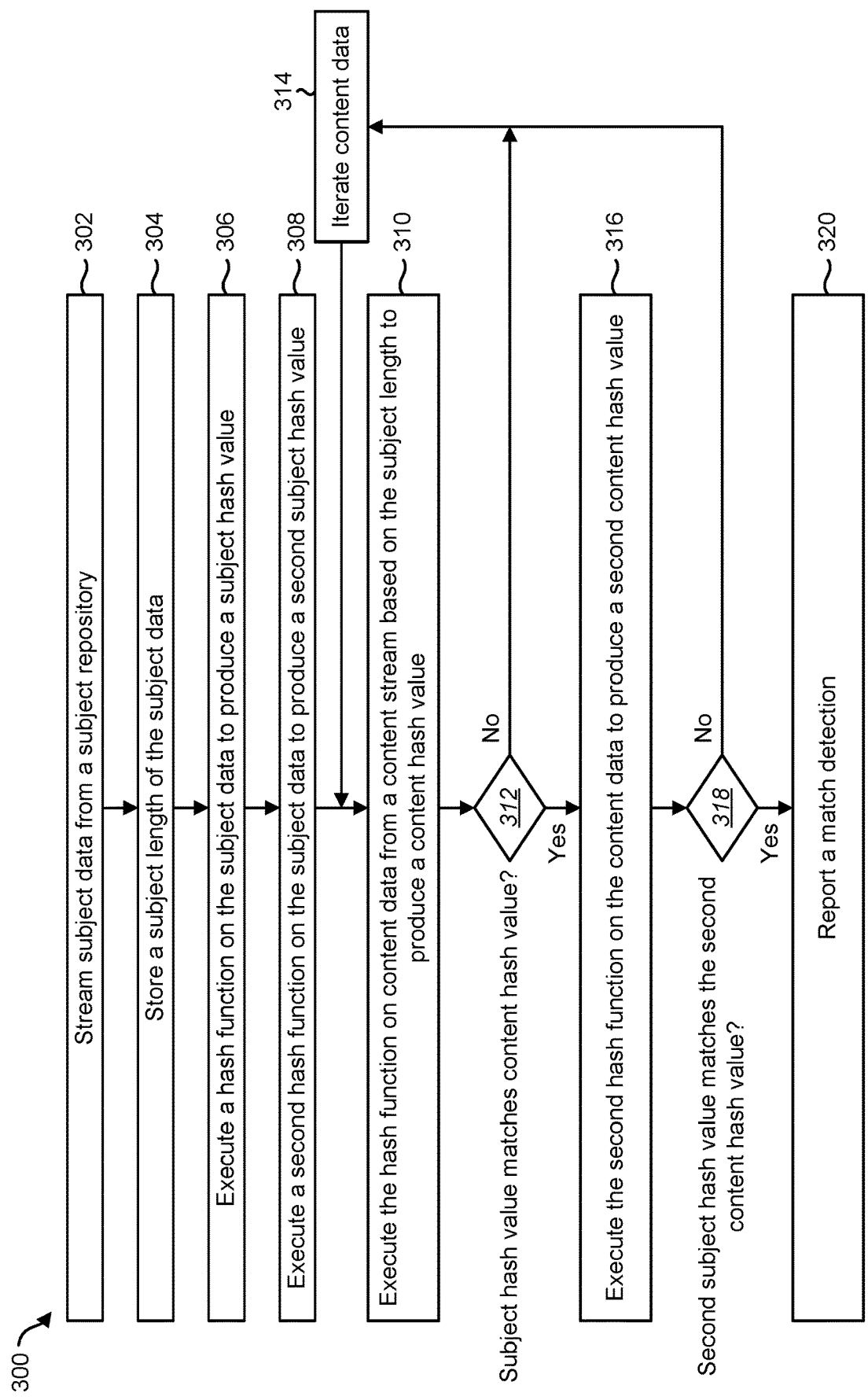
FIG. 3 is a flow diagram illustrating an example of another configuration of a method for securely identifying content.

FIG. 3 is a flow diagram illustrating an example of another configuration of a method 300 for securely identifying content. In some examples, the method 300 may be performed by a computing device (e.g., the computing device 102 described in relation to FIG. 1).

A computing device may stream 302 subject data from a subject repository. In some examples, streaming 302 subject data may be performed as described in relation to one or more of FIGS. 1-2.

The computing device may store 304 a subject length of the subject data. In some examples, storing 304 the subject length of the subject data may be performed as described in relation to one or more of FIGS. 1-2. For instance, the computing device may store the subject length in memory and/or in a database (e.g., subject profile database).

The computing device may execute 306 a hash function on the subject data to produce a subject hash value. In some examples, executing 306 the hash function on the subject data may be performed as described in relation to one or more of FIGS. 1-2. For instance, the computing device may execute a polynomial hash function on the subject data to produce the subject hash value. In some examples, the subject hash value may be stored in the subject profile database.

The computing device may execute 308 a second hash function on the subject data to produce a second subject hash value. In some examples, executing 308 the second hash function on the subject data may be performed as described in relation to one or more of FIGS. 1-2. For instance, the computing device may execute an SHA-2 hash function on the subject data to produce the second subject hash value. In some examples, executing 308 the second hash function on the subject data may be performed before or after a match of the subject hash value and the content hash value is determined. For instance, executing 308 the second hash function (once for each subject data or string, for instance) after a match of the corresponding subject hash value and the content hash value is determined, may increase processing efficiency by executing the second hash function only for subject data and/or content data that have a high probability of a match. In some examples, the second subject hash value may be stored in the subject profile database.

The computing device may execute 310 the hash function on content data from a content stream based on the subject length to produce a content hash value. In some examples, executing 310 the hash function on the content data may be performed as described in relation to one or more of FIGS. 1-2. For instance, the computing device may execute a polynomial hash function on a portion (e.g., character range) of the content stream to produce the content hash value.

The computing device may determine 312 whether the subject hash value matches the content hash value. In some examples, determining 312 whether the subject hash value matches the content hash value may be performed as described in relation to one or more of FIGS. 1-2. For instance, the computing device may compare the subject hash value to the content hash value, where the subject hash value and the content hash value are computed with a polynomial hash function. For example, if the subject hash value and the content hash value are equal, the computing device may determine that the subject hash value and the content hash value match.

In a case that it is determined that the subject hash value does not match the content hash value, the computing device may iterate 314 content data. In some examples, iterating 314 content data may be performed as described in relation to FIG. 1. For instance, the computing device may shift a character range (e.g., portion of the character stream, a window, etc.) in the content stream. For example, the computing device may drop a character from one end of the character range and add character to another end of the character range to get updated content data. The computing device may return to execute 310 the hash function on the (updated) content data.

In a case that the subject hash value matches the content hash value, the computing device may execute 316 the second hash function on the content data to produce a second content hash value. In some examples, executing 316 the second hash function on the content data may be performed as described in relation to one or more of FIGS. 1-2. For instance, the computing device may execute an SHA-2 hash function on the content data.

The computing device may determine 318 whether the second subject hash value matches the second content hash value. In some examples, determining 318 whether the second subject hash value matches the second content hash value may be performed as described in relation to one or more of FIGS. 1-2. For instance, the computing device may compare the second subject hash value to the second content hash value, where the second subject hash value and the second content hash value are computed with an SHA-2 hash function. For example, if the second subject hash value and the second content hash value are equal, the computing device may determine that the subject hash value and the content hash value match.

In a case that it is determined that the second subject hash value does not match the second content hash value, the computing device may iterate 314 content data. For instance, the computing device may shift a character range (e.g., portion of the character stream, a window, etc.) in the content stream and may return to execute 310 the hash function on the (updated) content data.

In a case that it is determined that the second subject hash value matches the second content hash value, the computing device may detect that the content data matches the subject data. The computing device may report 320 a match detection. For instance, the computing device may report 320 a match detected in response to determining that the second subject hash value matches the second content hash value. In some examples, reporting 320 the match detection may be performed as described in relation to one or more of FIGS. 1-2. In some examples, the computing device may store a location of the content data (in the subject profile database, for instance).

Some examples of the techniques described herein may include hashing sensitive data associated with identities for searching and/or tracking. In some examples, hashes of that sensitive data may be stored (without indefinitely storing the sensitive data, for instance). As the content stream (e.g., each document or chunk of text) is scanned for sensitive data, portions of the content stream may be hashed as each character is read in. The content hash values may be compared to a set (e.g., list) of hashes to search for. If the content hash value (from document text, for instance) matches one of the subject hash values, a match has been found and may be reported to a user.

In order to provide efficiency in searching a content stream and accuracy in identifying matches, two hash values may be computed and stored using separate hash functions in some approaches. For example, a first hash value may be computed using a polynomial rolling hash function. The second hash value may be computed using a stronger SHA-256 hash function. The number of characters in the original subject (e.g., search term) may be stored.

In some examples, the rolling hash may be used to quickly and efficiently compute hash values on a rolling window of text. In some examples, before scanning, the subject hash values being searched may be grouped by the character length of the subject data. During the scan for each distinct character length, a separate rolling hash may be maintained. As each character is read in, the character at the beginning of the window may be removed from each hash value, and a new character may be added to each hash value. Each hash value may be compared with the set (e.g., list) of hashes that have the associated character length of the source value. In some examples, the rolling hashes may be computed one character at a time, which may allow for more efficient scanning than recomputing the entire hash value each time the window of text moves.

If a match found using the rolling hash function, the content data (e.g., chunk of text) that is matched may be used to compute a SHA-256 hash value, which may be checked against the corresponding SHA-256 hash value from the subject data. This may reduce the chance of a false positive, as the chance of collision in a SHA-256 hash may be much lower than in the rolling hash function.

Some of the techniques described herein may provide content scans for sensitive data that matches patterns that certain sensitive data may have. For example, some of the techniques described herein may enable searching for specific sensitive data for a given subject without storing the sensitive data in a centralized location. In some examples, a computing device may perform the scan and/or search in response to a message (e.g., search message) received from a remote device (e.g., client device).

Figure 4:
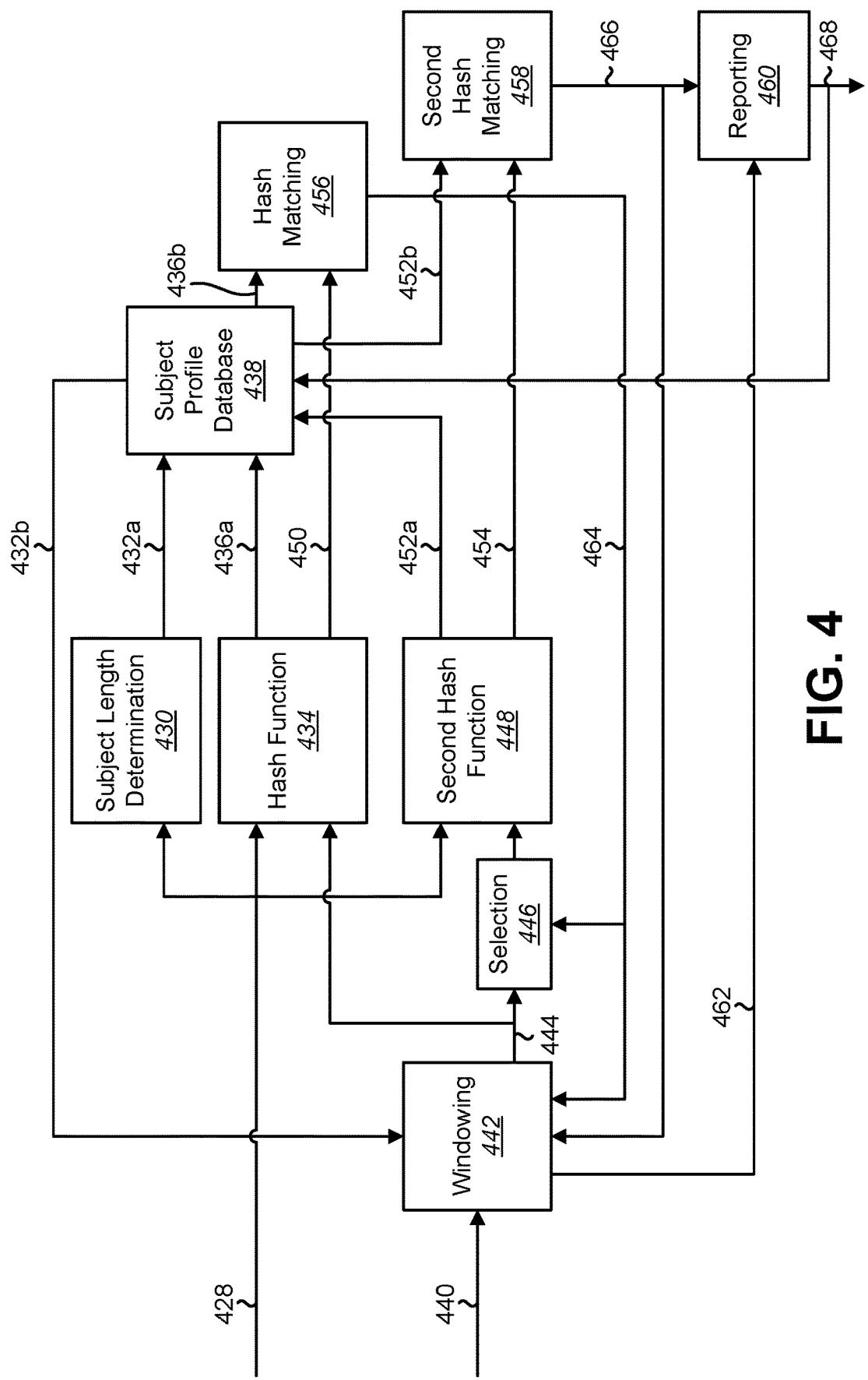
FIG. 4 is a block diagram illustrating examples of structures that may be implemented for securely identifying content.

FIG. 4 is a block diagram illustrating examples of structures that may be implemented for securely identifying content. For instance, the structures of FIG. 4 include a subject length determination 430, windowing 442, a hash function 434, a selection 446, a second hash function 448, a subject profile database 438, hash matching 456, second hash matching 458, and reporting. One or more of the structures described in relation to FIG. 4 may be implemented in hardware (e.g., circuitry, logic circuitry, etc.) and/or in a combination of hardware and instructions (e.g., a processor with instructions). In some examples, one or more of the structures described in relation to FIG. 4 may be implemented in a computing device or other electronic device. One or more of the structures described in relation to FIG. 4 may perform one or more operations as described in relation to one or more of FIGS. 1-3.

Subject data 428 may be provided to the subject length determination 430, to the hash function 434, and to the second hash function 448. For instance, subject data 428 may be provided from a subject stream. The subject length determination 430 may determine a subject length 432a of the subject data. The subject length 432a may be provided to the subject profile database 438. For instance, the subject length 432a may be stored in the subject profile database 438.

The hash function 434 may determine a subject hash value 436a corresponding to the subject data 428. The subject hash value 436a may be provided to the subject profile database 438. For instance, the subject hash value 436a may be stored in the subject profile database 438.

The second hash function 448 may determine a second subject hash value 452a corresponding to the subject data 428. The second subject hash value 452a may be provided to the subject profile database 438. For instance, the second subject hash value 452a may be stored in the subject profile database 438.

The subject length 432b may be provided from the subject profile database 438 to windowing 442. A content stream 440 may also be provided to windowing 442. Windowing 442 may extract content data 444 (e.g., a content data string) based on the subject length 432b. For instance, windowing 442 may extract a set of characters from the content stream 440, where the set of characters includes a number of characters indicated by the subject length 432b. The set of characters may be the content data 444. The content data 444 may be provided to the hash function 434 and to selection 446. In some examples, windowing 442 may determine a location 462. For instance, windowing 442 may indicate a location 462 of the content data 444 in the content stream. The location 462 may be provided to reporting 460.

The hash function 434 may determine a content hash value 450 corresponding to the content data 444. In some examples, the hash function 434 may be implemented in accordance with a polynomial hash function. The content hash value 450 may be provided to hash matching 456. The hash matching 456 may determine whether the subject hash value 436b from the subject profile database 438 matches the content hash value 450. The hash matching 456 may provide a matching indicator 464 to selection 446 and/or to windowing 442. For instance, the matching indicator 464 may indicate whether the subject hash value 436b matches the content hash value 450 or not.

If the matching indicator 464 indicates that the subject hash value 436b and the content hash value 450 do not match, selection 446 may not provide the content data 444 to the second hash function 448 and/or may control that the second hash function 448, second hash matching 458, and/or reporting 460 not be performed for that content data 444. If the matching indicator 464 indicates that the subject hash value 436b and the content hash value 450 do not match, windowing 442 may shift content extraction from the content stream 440 to determine next content data 444.

Selection 446 may select the content data 444 based on whether the subject hash value 436b matches the content hash value 450. For instance, if the matching indicator 464 indicates that the subject hash value 436b matches the content hash value 450, selection 446 may provide the content data 444 to the second hash function 448 and/or control the second hash function 448 to compute a second content hash value 454 based on the content data 444. In some examples, the second hash function 448 may be implemented in accordance with an SHA-2 hash function.

The second content hash value 454 may be provided to the second hash matching 458. The second hash matching 458 may determine whether the second subject hash value 452b from the subject profile database 438 matches the second content hash value 454. The second hash matching 458 may provide a second matching indicator 466 to selection 446 and/or to windowing 442. For instance, the second matching indicator 466 may indicate whether the second subject hash value 452b matches the second content hash value 454 or not. In some examples, windowing 442 may shift content extraction from the content stream 440 to determine next content data 444 (whether or not the second subject hash value 452b matches the second content hash value 454, for instance).

If the second matching indicator 466 indicates that the second subject hash value 452b matches the second content hash value 454, the reporting 460 may produce a report 468 indicating that a match was detected at the location 462. For instance, the report 468 may be presented on a display to a user. In some examples, the reporting 460 may cause the location 462 to be stored. For instance, the report 468 (e.g., location 462) may be stored in the subject profile database 438 in some approaches.

Figure 5:
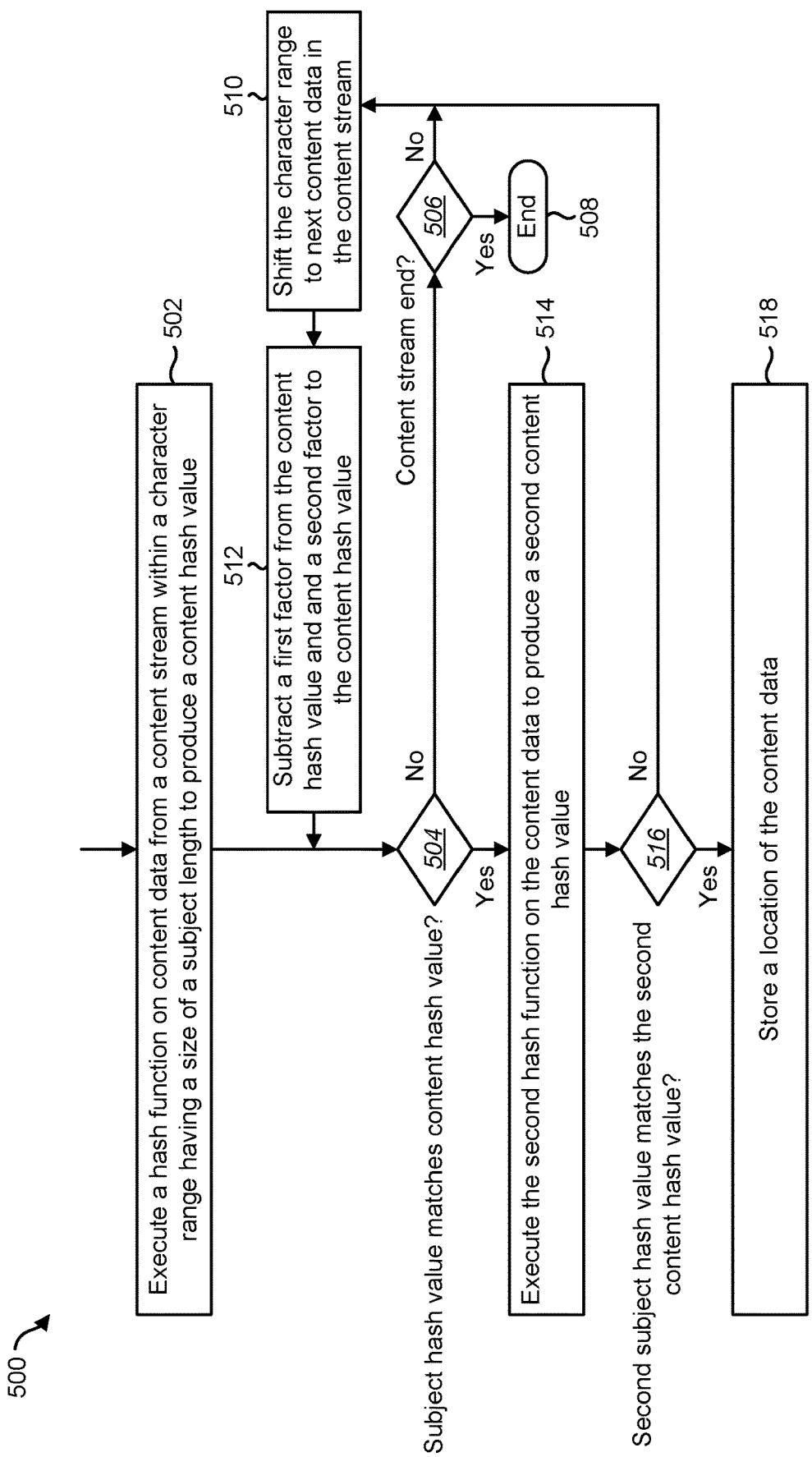
FIG. 5 is a flow diagram illustrating an example of another configuration of a method for securely identifying content.

FIG. 5 is a flow diagram illustrating an example of another configuration of a method 500 for securely identifying content. In some examples, the method 500 may be performed by a computing device (e.g., the computing device 102 described in relation to FIG. 1). In some examples, the method 500 may be performed in conjunction with one or more of the functions and/or operations described in relation to one or more of FIGS. 1-4.

The computing device may execute 502 a hash function on content data from a content stream within a character range having a size of a subject length to produce a content hash value. In some examples, executing 502 the hash function on the content data may be performed as described in relation to one or more of FIGS. 1-4.

The computing device may determine 504 whether a subject hash value matches the content hash value. In some examples, determining 504 whether the subject hash value matches the content hash value may be performed as described in relation to one or more of FIGS. 1-4.

In a case that it is determined that the subject hash value does not match the content hash value, the computing device may determine 506 whether an end of the content stream has been reached. For instance, the computing device may determine whether the content stream has ended and/or whether a set of content from one or more content repositories has been completely searched. In a case that it is determined that the end of the content stream is reached, operation may end 508.

In a case that it is determined that the end of the content stream has not been reached, the computing device may shift 510 the character range to next content data in the content stream. In some examples, shifting 510 the character range may be performed as described in relation to one or more of FIGS. 1-4. For instance, the computing device may drop a character from one end of the character range and add character to another end of the character range to get the next (e.g., updated) content data.

In some examples, the computing device may execute the hash function on the next content data. For instance, the computing device may execute the hash function on the next content data in response to detecting that the content data does not match the subject data (e.g., in response to determining 504 that the subject hash value does not match the content hash value and in response to determining 506 that the end of the content stream is not reached). In some examples, executing the hash function on the next content data may include subtracting 512 a first factor from the content hash value and adding a second factor to the content hash value to produce an updated content hash value. The first factor may be associated with a first character dropped from the character range and/or the second factor may be associated with a second character added to the character range. In some examples, this may be performed as described in relation to one or more of FIGS. 1-4.

In a case that the subject hash value matches the content hash value (or next content hash value, etc.), the computing device may execute 514 the second hash function on the content data to produce a second content hash value. In some examples, executing 514 the second hash function on the content data may be performed as described in relation to one or more of FIGS. 1-4.

The computing device may determine 516 whether the second subject hash value matches the second content hash value. In some examples, determining 516 whether the second subject hash value matches the second content hash value may be performed as described in relation to one or more of FIGS. 1-4.

In a case that it is determined that the second subject hash value does not match the second content hash value, the computing device may shift 510 the character range to next content data in the content stream and so on as described above.

In a case that it is determined that the second subject hash value matches the second content hash value, the computing device may store 518 a location of the content data. In some examples, storing 518 the location may be performed as described in relation to one or more of FIGS. 1-4. In some examples, the computing device may store a location of the content data (in the subject profile database, for instance).

Figure 6:
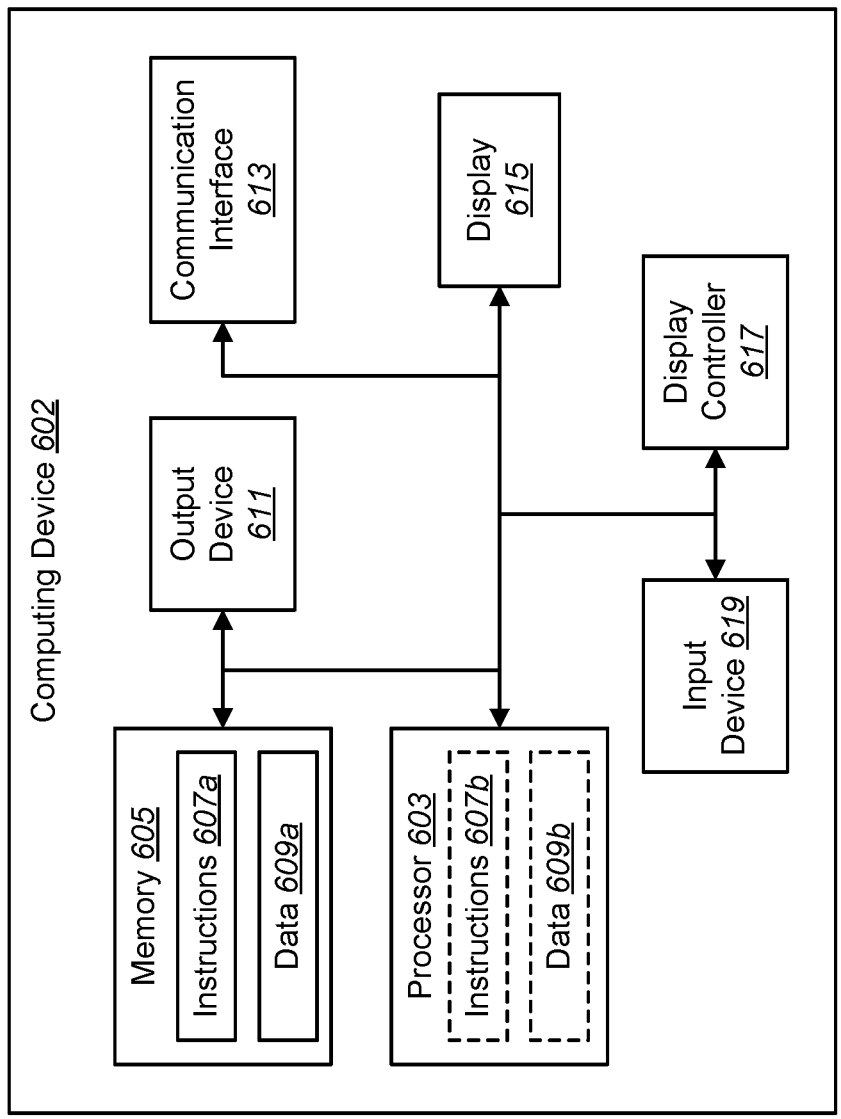
FIG. 6 is a block diagram illustrating components that may be utilized by a computing device.

FIG. 6 is a block diagram illustrating components that may be utilized by a computing device 602. The computing device 602 may be configured for securely identifying content as described herein. In some examples, the computing device 602 may be implemented in accordance with the computing device 102 described in relation to FIG. 1.

The computing device 602 may communicate with other electronic devices through one or more communication interfaces 613. Communication through the communication interface 613 may be achieved through wired communication, wireless communication, or both wired and wireless communication. For example, the communication interface 613 may be a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The computing device 602 may receive and transmit information through one or more input devices 619 and one or more output devices 611. The input devices 619 may be a keyboard, mouse, microphone, remote control device, button, joystick, trackball, touchpad, and/or lightpen, etc. The output devices 611 may be a speaker, printer, etc. A display device 615 is an output device 611 that may be included in a computer system. Display devices 615 may project information through different technologies, such as liquid crystal display (LCD), light-emitting diode (LED), gas plasma, electroluminescence, a cathode ray tube (CRT), or the like.

A processor 603 controls the operation of the computing device 602 and may be a microprocessor, a microcontroller, a digital signal processor (DSP), or other device. A memory 605 may be included in the computing device 602 and includes instructions 607a and data 609a to assist the processor 603 in operating the computing device 602. The memory 605 may send program instructions 607b and/or data 609b to the processor 603 in order for the processor 603 to perform logical and arithmetic operations according to methods disclosed herein. The processor 603 may execute one or more of the instructions stored in the memory 605 to implement one or more of the systems and methods disclosed herein.

Data 609a stored in the memory 605 may be converted to text, graphics, and/or moving images (as appropriate) by a display controller 617. Of course, FIG. 6 illustrates only one possible configuration of a computing device 602. Various other architectures and/or components may be utilized.

In an implementation, the computing device 602 may be a headless server. For example, the computing device 602 may be configured to provide services to other computing devices with or without peripheral input/output interfaces.

In another implementation, the computing device 602 may be configured to run on desktop and server hardware, both physical and virtual. In yet another implementation, the computing device 602 may be configured to run desktop and server Microsoft Windows operating systems.

Figure 7:
FIG. 7 is a block diagram illustrating an example of a computer-readable medium for securely identifying content.

FIG. 7 is a block diagram illustrating an example of a computer-readable medium 721 for securely identifying content. The computer-readable medium 721 is a non-transitory, tangible computer-readable medium. In some examples, the computer-readable medium 721 may be, for example, RAM, PROM, ROM, EPROM, NVRAM, EEPROM, and/or a storage device, etc. In some examples, the computer-readable medium 721 may include volatile memory and/or non-volatile memory. For instance, the computer-readable medium 721 may include RAM and a separate solid state drive (SSD) or a separate hard disk drive (HDD). In some examples, the computer-readable medium 721 described in FIG. 7 may be an example of the memory 108 described in relation to FIG. 1 or the memory 605 described in relation to FIG. 6.

The computer-readable medium 721 may include data (e.g., information, instructions, etc.). In the example of FIG. 7, the computer-readable medium 721 includes streaming instructions 723, storage instructions 725, hash function instructions 727, match detection instructions 729, and/or match reporting instructions 731.

The streaming instructions 723 may include instructions executable by a processor of a computing device to stream subject data from a subject repository. In some examples, streaming subject data from a subject repository may be performed as described in relation to one or more of FIGS. 1-6. In some examples, the subject data may be streamed to volatile memory (e.g., RAM).

The storage instructions 725 may include instructions executable by a processor of a computing device to store a subject length of the subject data. In some examples, storing the subject length of the subject data may be performed as described in relation to one or more of FIGS. 1-6. In some examples, the subject length may be stored in non-volatile memory.

The hash function instructions 727 may include instructions executable by a processor of a computing device to execute a hash function(s) on the subject data to produce a subject has value(s) and/or to execute a hash function(s) on content data from a content stream based on the subject length to produce a content hash value(s). In some examples, executing the hash function(s) may be performed as described in relation to one or more of FIGS. 1-6. In some examples, the content hash value(s) and/or the subject hash value(s) may be stored in non-volatile memory. In some examples, once the content hash value(s) and/or the subject hash value(s) are stored, the streamed subject data and/or streamed content data may be discarded, deleted, and/or overwritten in the volatile memory (e.g., RAM).

The match detection instructions 729 may include instructions executable by a processor of a computing device to detect whether the content data matches the subject data based on the subject hash value and the content hash value. In some examples, determining whether the content data matches the subject data may be performed as described in relation to one or more of FIGS. 1-6. In some examples, a match may be detected if a first content hash value matches a first subject hash value and if a second content hash value matches a second subject hash value.

The match reporting instructions 731 may include instructions executable by a processor of a computing device to report a match detection in response to detecting that the content data matches the subject data. In some examples, reporting the match detection may be performed as described in relation to one or more of FIGS. 1-6.

FIG. 8 is a block diagram illustrating one configuration of a network 833 where systems and methods for security identifying content may be implemented. An application server 837 may be connected to one or more clients 839. The application server 837 may also be connected to one or more servers 835.

The application server 837 may be implemented in accordance with the computing device 102 described in relation to FIG. 1. The server(s) 835 may be examples of the subject repository 104 and/or of the content repository 124 described in relation to FIG. 1. The client(s) 839 may be one or more computing devices capable of interacting with the application server 837. For example, a client 839 may send a search request to the application server 837 to search for and/or identify content corresponding to one or more subjects (e.g., subject(s) in a subject repository). In some examples, the application server 837 may identify one or more locations of the content matching the subject(s). In some examples, the application server 837 may report whether any match was found and/or may report location(s) of any matches to the requesting client. In some examples, the application server 837 may receive a request to delete and/or obscure the matching content from a content repository (ies) (e.g., server 835). The application server 837 may delete and/or obscure the matching content and/or may request that the content repository (ies) delete and/or obscure the matching content. Various other architectures and components may be utilized.

Some of the techniques described herein may enable searching for specific sensitive data for a variety of users without storing (e.g., without storing indefinitely) the data being searched for. Some of the techniques may utilize one or more entities (e.g., device(s) and/or service(s), etc.) to build subject profiles, representing the sensitive data as a hashed value, and/or keeping the sensitive data (e.g., user information) secure. In some examples, when scanning for these subject profile values, the contents being scanned may be hashed in the same way the subject profile has been stored. In some examples, this may allow for the identification of the location of specific sensitive information without storing the information in a centralized location.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth, and/or virtual instances thereof. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, compact disc read-only memory (CD-ROM), any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

As used herein, the term "and/or" may denote one or more items. For example, the phrase "A, B, and/or C" may mean any of: only A, only B, only C, A and B (but not C), B and C (but not A), A and C (but not B), or all of A, B, and C. As used herein, the phrase "one or more of" may denote one or more items. For example, the phrase "one or more of A, B, and C" or the phrase "one or more of A, B, or C" may mean any of: only A, only B, only C, A and B (but not C), B and C (but not A), A and C (but not B), or all of A, B, and C.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A method, comprising:
   streaming subject data from a subject repository;
   storing a subject length of the subject data;
   executing a hash function on the subject data to produce a subject hash value;
   streaming content data from a content repository to provide a content stream, wherein the content repository is separate from the subject repository;
   executing the hash function on the content data from the content stream based on the subject length to produce a content hash value;
   detecting whether the content data matches the subject data based on the subject hash value and the content hash value; and
   reporting a match detection in response to detecting that the content data matches the subject data.

2. The method of claim 1, further comprising storing a location of the content data in response to detecting that the content data matches the subject data.

3. The method of claim 1, further comprising executing a second hash function on the subject data to produce a second subject hash value, wherein the second hash function has a lower collision probability than the hash function.

4. The method of claim 3, further comprising:
   determining whether the subject hash value matches the content hash value; and
   executing the second hash function on the content data to produce a second content hash value in response to determining that the subject hash value matches the content hash value.

5. The method of claim 4, wherein detecting whether the content data matches the subject data comprises:
   determining whether the second subject hash value matches the second content hash value in response to determining that the subject hash value matches the content hash value; and
   detecting that the content data matches the subject data in response to determining that the second subject hash value matches the second content hash value.

6. The method of claim 3, wherein the hash function is a polynomial hash function and the second hash function is a secure hash algorithm (SHA) hash function.

7. The method of claim 1, wherein the content data is within a character range having a size of the subject length, the method further comprising shifting the character range to next content data in the content stream and executing the hash function on the next content data in response to detecting that the content data does not match the subject data.

8. The method of claim 7, wherein executing the hash function on the next content data comprises subtracting a first factor from the content hash value and adding a second factor to the content hash value to produce an updated content hash value, wherein the first factor is associated with a first character dropped from the character range, and wherein the second factor is associated with a second character added to the character range.

9. The method of claim 1, wherein:
   storing the subject length of the subject data comprises storing a set of subject string lengths corresponding to a set of subject strings, and
   executing the hash function on the subject data comprises executing the hash function on the set of subject strings to produce a set of subject hash values,
   and wherein the method further comprises categorizing the subject hash values according to corresponding subject string lengths.

10. A computing device, comprising:
    a processor;
    a memory in electronic communication with the processor; and
    instructions stored in the memory, the instructions being executable to:
      stream subject data from a subject repository;
      store a subject length of the subject data;
      execute a hash function on the subject data to produce a subject hash value;
      stream content data from a content repository to provide a content stream, wherein the content repository is separate from the subject repository;
      execute the hash function on the content data from the content stream based on the subject length to produce a content hash value;
      detect whether the content data matches the subject data based on the subject hash value and the content hash value; and
      report a match detection in response to detecting that the content data matches the subject data.

11. The computing device of claim 10, wherein the instructions are executable to store a location of the content data in response to detecting that the content data matches the subject data.

12. The computing device of claim 10, wherein the instructions are executable to execute a second hash function on the subject data to produce a second subject hash value, wherein the second hash function has a lower collision probability than the first hash function.

13. The computing device of claim 12, wherein the instructions are executable to:
determine whether the subject hash value matches the content hash value; and
execute the second hash function on the content data to produce a second content hash value in response to determining that the subject hash value matches the content hash value.

14. The computing device of claim 13, wherein the instructions are executable to detect whether the content data matches the subject data by:
determining whether the second subject hash value matches the second content hash value in response to determining that the subject hash value matches the content hash value; and
detecting that the content data matches the subject data in response to determining that the second subject hash value matches the second content hash value.

15. The computing device of claim 12, wherein the first hash function is a polynomial hash function and the second hash function is a secure hash algorithm (SHA) hash function.

16. The computing device of claim 10, wherein the content data is within a character range having a size of the subject length, and wherein the instructions are executable to shift the character range to second content data in the content stream and execute the hash function on the second content data in response to detecting that the content data does not match the subject data.

17. The computing device of claim 16, wherein the instructions are executable to execute the hash function on the second content data by subtracting a first factor from the subject hash value and adding a second factor to the subject hash value to produce a second subject hash value, wherein the first factor is associated with a first character dropped from the character range, and wherein the second factor is associated with a second character added to the character range.

18. The computing device of claim 10, wherein:
the instructions executable to store the subject length of the subject data comprise instructions executable to store a set of subject string lengths corresponding to a set of subject strings, and
the instructions executable to execute the hash function on the subject data comprise instructions executable to execute the hash function on the set of subject strings to produce a set of subject hash values,
and wherein the instructions are executable to categorize the subject hash values according to corresponding subject string lengths.

19. A non-transitory, tangible computer-readable medium, comprising executable instructions for:
streaming subject data from a subject repository;
storing a subject length of the subject data;
executing a hash function on the subject data to produce a subject hash value;
streaming content data from a content repository to provide a content stream, wherein the content repository is separate from the subject repository;
executing the hash function on the content data from the content stream based on the subject length to produce a content hash value;
detecting whether the content data matches the subject data based on the subject hash value and the content hash value; and
reporting a match detection in response to detecting that the content data matches the subject data.

20. The computer-readable medium of claim 19, further comprising instructions for executing a second hash function on the subject data to produce a second subject hash value, wherein the second hash function has a lower collision probability than the first hash function.

\* \* \* \* \*